United States Patent [19]

Bechu et al.

[11] Patent Number: 5,033,395

[45] Date of Patent: Jul. 23, 1991

[54] MEMBRANE SYSTEM FOR CONNECTING RAILWAY VEHICLES OR THE LIKE

[75] Inventors: Jean-Pierre Bechu, Courbevoie; Jacques Cathala, Ballan-Mire; Pierre Evanot; Roland Wanneroy, both of Paris, all of France

[73] Assignee: Caoutchouc Manufacture et Plastiques, Versailles, France

[21] Appl. No.: 328,404

[22] Filed: Mar. 24, 1989

[30] Foreign Application Priority Data

Mar. 25, 1988 [FR] France ................................. 88 03979

[51] Int. Cl.$^5$ ......................... B60D 5/00; B61D 17/20
[52] U.S. Cl. ....................................... 105/18; 280/403
[58] Field of Search ...................... 105/8.1, 9, 10, 15, 105/18, 19, 20; 280/403

[56] References Cited

U.S. PATENT DOCUMENTS

| 2,991,509 | 7/1961 | Brophy, Jr. ............................ 105/15 |
| 3,919,444 | 11/1975 | Shayman ........................ 264/219 X |
| 4,257,645 | 3/1981 | Balogh ................................ 296/166 |
| 4,663,226 | 5/1987 | Vajs et al. ...................... 252/606 X |
| 4,798,148 | 1/1989 | Girard ............................... 105/18 X |
| 4,858,535 | 8/1989 | Bechu et al. .......................... 105/15 |
| 4,860,665 | 8/1989 | Schmidt .......................... 280/403 X |
| 4,905,607 | 3/1990 | Wanneroy ........................... 280/403 |

FOREIGN PATENT DOCUMENTS

| 0067944 | 12/1982 | European Pat. Off. . |
| 0114913 | 8/1984 | European Pat. Off. . |
| 0206910 | 12/1986 | European Pat. Off. . |
| 0248685 | 12/1987 | European Pat. Off. . |
| 0336809 | 10/1989 | European Pat. Off. . |
| 695534 | 12/1930 | France . |
| 2333657 | 4/1980 | France . |
| 2328141 | 5/1980 | France . |
| 2348829 | 3/1982 | France . |
| 2496030 | 6/1983 | France . |
| 2599695 | 12/1983 | France . |
| 2529836 | 1/1984 | France . |
| 2568195 | 1/1986 | France . |
| 2573714 | 5/1986 | France . |
| 2629034 | 9/1989 | France . |
| 446003 | 4/1936 | United Kingdom . |
| 471036 | 8/1937 | United Kingdom . |
| 771511 | 4/1957 | United Kingdom . |
| 2122956 | 1/1984 | United Kingdom . |

Primary Examiner—Joseph F. Peters, Jr.
Assistant Examiner—Virna Lissi Mojica
Attorney, Agent, or Firm—Nils H. Ljungman & Associates

[57] ABSTRACT

A preferred membrane system is for connecting railway vehicles or the like. Each of the vehicles has longitudinal walls extending along a direction of movement of the vehicle and ends extending substantially transverse to the longitudinal walls. The system comprises an elastically deformable membrane having a tubular form for substantial alignment with the longitudinal walls between the ends of the vehicles being adjacent to one another. The membrane has opposite ends for being respectively connected to the ends of the vehicles being adjacent to one another. The membrane includes a plurality of corrugations with each of the corrugations extending around the tubular form. Elements for connecting the vehicle provide a predetermined distance between the ends thereof. The membrane and the corrugations thereof are partially compressed when the opposite ends are disposed from each other by the predetermined distance. Additionally, the membrane can include a plurality of longitudinal sections with at least some of the longitudinal sections being generally curved about a longitudinally extending axis and at least others of the longitudinal sections being generally planar to be parallel with the longitudinally extending axis.

28 Claims, 6 Drawing Sheets

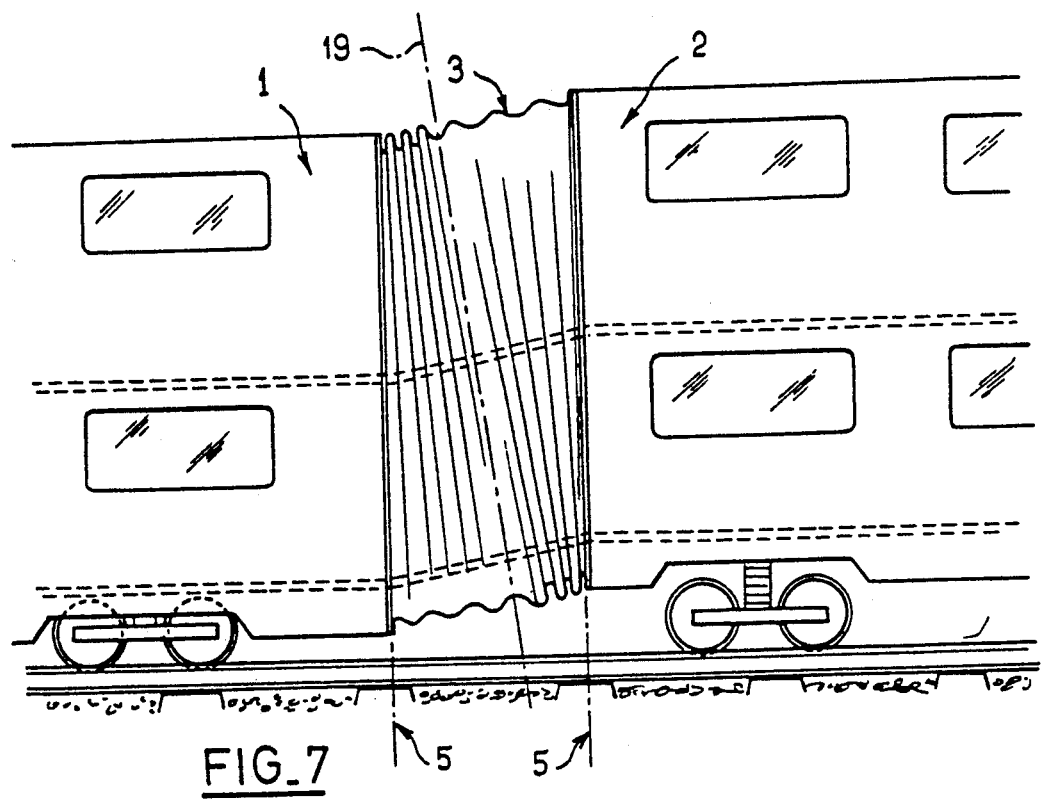
FIG_7
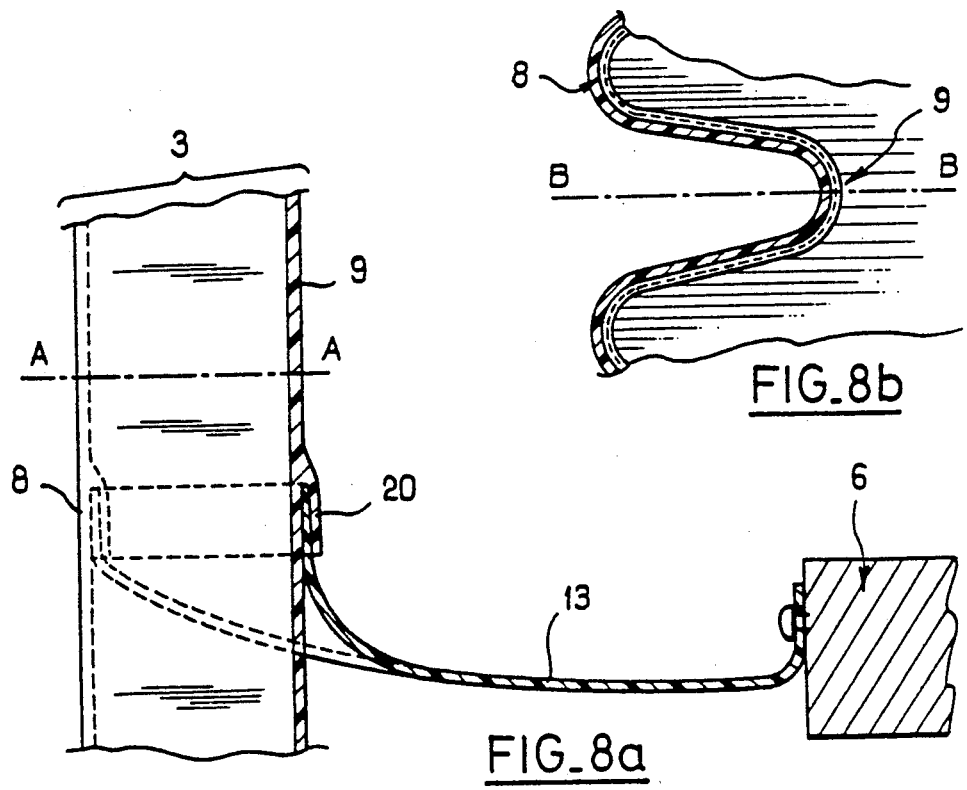
FIG_8b
FIG_8a

MEMBRANE SYSTEM FOR CONNECTING RAILWAY VEHICLES OR THE LIKE

BACKGROUND OF THE INVENTION

1. Field of the Invention:

This invention relates to a membrane system which makes possible intercommunication between successive railway or road vehicles, by means of an elastically deformable membrane in the form of concertina bellows completely surrounding the exposed passage. The membrane serves as an extension of the longitudinal walls of two vehicles and is used for the transport of passengers therebetween or for use on an auto-train.

2. Description of the Prior Art:

A concertina bellows with a large cross section is currently formed of rubberized fabric in accordion folds to allow for large deflections. Various devices seeking to give the bellows a self-supporting character have also been proposed. In particular, HUBNER-GUMMI UND KUNSTSTOFFE disclosed in its French Patent No. 2,348,829 the formation of additional pleats in the corners. TAURUS GUMMIIPARI disclosed in its French Patent No. 2,529,836 a concertina bellows, possibly molded, with different thicknesses in the sides and at the base of the pleats.

Likewise, HUBNER describes in the utility model registration French Patent No. 2,333,657 the possibility of a multi-layer composite, which provides acoustical and thermal insulation. TAURUS, in its French Patent No. 2,328,141, utilizes such a composite as a self-supporting entity, by a variation of the width of the flat corrugations which are alternately connected by their outside and inside edges.

FAIVELEY, in its French Patent No. 2,496,030, and S.I.G. in its French Patent No. 2,568,195, also describe an intercommunication device, enclosed on all sides, with a central frame supported by a coupling or by arms, and connected to the inside of the vehicles by a deformable membrane, which is not precisely defined. S.I.G. states in particular that this device requires "membranes realized by molding, which are corrugated, thick, elastic" and provided with insulation capabilities and flame-resistant. FAIVELEY, in the above-referenced patent, declares this membrane to be "deformable or pleated".

French Patent No. 2,573,714 of FAIVELEY also describes an intercommunication corridor which is equipped with one or two envelopes connecting a frame to the ends of the mass transit vehicles to allow free passage from one vehicle to the other.

The prior art appears to recognize many of the requirements for such membranes. However, the prior art does not include any technique which is capable of correctly satisfying the contradictory requirements of having a flexible but self-supporting character, while providing thermal insulation, acoustical insulation, and protection against the wind caused by the speed of travel and also being capable of being made economical and light weight.

Along other lines, CAOUTCHOUC MANUFACTURE ET PLASTIQUES, in its European Patent No. 0,206,910, discloses an intercommunication tunnel with an oval cross section which has a self-supporting wall that is deformable overall. The tunnel is of a one-piece construction, tends to perform all the functions of an intercommunication device, but, because of its rigidity, is smaller than the full cross section of the vehicles. In European Patent Application 87.400784-2 of CAOUTCHOUC MANUFACTURE ET PLASTIQUES directed to a rigid intercommunication ring, there is disclosed a rolling connection between the vehicle bodies, which could also be applied to the above-mentioned tunnel.

OBJECT OF THE INVENTION

It is an object of the present invention to provide a system for connecting railway vehicles or the like including a membrane which serves as a continuous connection between two consecutive vehicles.

It is another object to provide such a membrane which does not tend to reduce the passage cross section but provides protection of the passengers and the vehicles against noise and bad weather.

It is yet another object to provide such a membrane which is economical to fabricate and easy to install.

SUMMARY OF THE INVENTION

These and other objects of the invention are provided in a preferred elastically deformable membrane for intercommunication between successive railway or road vehicles which is designed to ensure a maximum passage cross section in the extension of the walls of the vehicles. The membrane is characterized by the fact that:

it comprises a corrugated surface which is formed by parallel rings;

in the rest position, it has an essentially sinusoidal cross section, wherein the portions of the rings separating two successive undulations, the one at the top and the other at the bottom, are completely flat and remain so in operation;

its wall, in the straight elements, consists of at least two continuous or discontinuous textile or metal plies embedded in and intimately bonded to an elastomeric compound of a formulation appropriate for the application, to allow the membrane to support its own weight without mechanical assistance;

in the curved and expandable connecting parts between the straight elements, it consists of at least two layers of elastomer compounds without textile or metal reinforcement so that the membrane can assume the maximum deformations;

its thickness is essentially constant; and it is installed under partial compression between the coupled vehicles to which it is connected by fastening flanges in a contact plane.

The preferred membrane provides protection of the passengers and vehicles against bad weather, projections, the wind due to travel at high speed and noise. The membrane encloses the coupling, the buffers and the intercommunication platforms. It provides an elastic connection in roll exerted upon the suspension of vehicles, primarily in vertical deflection within the limit of the requirements encountered in articulated transit cars or auto-train shuttles.

To provide the objects of the present invention, there is included a preferred system for connecting railway vehicles or the like. Each of the vehicles has longitudinal walls extending along a direction of movement of the vehicle and ends extending substantially transverse to the longitudinal walls. The system comprises an elastically deformable membrane having at least a partial tubular form for substantial alignment with the longitudinal walls between the ends of the vehicles being adjacent to one another. The membrane has opposite ends for being respectively connected to the ends of the vehicles being adjacent to one another. The membrane includes a plurality of corrugations with each of the corrugations extending at least partially around the tubular form. Elements for connecting the vehicles position the vehicles to provide a substantially predetermined distance between the ends thereof. The membrane and the corrugations thereof are partially compressed when the opposite ends are disposed from each other by the predetermined distance.

Still further, the preferred system for connecting railway vehicles or the like may include the elastically deformable membrane having at least a partial tubular form for substantial alignment with the longitudinal walls between the ends of said vehicles. The membrane has opposite ends for being respectively connected to the ends of the vehicles. The membrane includes a plurality of corrugations with each of the corrugations extending at least partially around the tubular form. The membrane includes a plurality of longitudinal sections. At least some of the longitudinal sections are generally curved about at least one longitudinally extending axis extending along the direction of movement of the vehicles. At least others of the longitudinal sections are generally planar to be parallel to the at least one longitudinally extending axis.

BRIEF DESCRIPTION OF THE DRAWINGS

The characteristics and advantages of the invention are described in greater detail below with reference to the accompanying drawings.

FIG. 7 is a side view of the preferred membrane when there is a maximum difference in levels between two successive vehicles.

FIG. 8a is an enlarged, fragmentary cross-sectional view of a portion of the preferred membrane as seen in FIG. 2, showing the connection of the preferred membrane to the floor by a preferred deformable concertina bellows.

FIG. 8b is a fragmentary sectional top view of the connection of FIG. 8a.

DESCRIPTION OF THE PREFERRED EMBODIMENTS

To simplify the explanation of the invention, the various elements of the elastically deformable membrane should initially be broadly defined. For example, "the straight elements" are all of the parts of the elastically deformable membrane which are defined by a straight-line translation of the roughly sinusoidal cross section. "The curved elements, portions or parts" are all of the parts of the elastically deformable membrane which are defined by the rotation around an axis generally parallel to the axis of the vehicles of this same roughly sinusoidal cross section.

Still further, "the flat part of the wall" is the vertical surface described by a straight-line generatrix which is located between an "outside corrugation" and an "inside corrugation". "The inside corrugation" includes a cross section of the wall in a plane generally transverse to the vehicle, which extends between two flat parts of the wall and is concave toward the outside of the vehicle. In the curved elements or portions, the inside corrugation would have two different and opposite radii of curvature. "The outside corrugation" includes a cross section of the wall in a plane generally transverse to the vehicle, which extends between two flat parts of the wall and is convex toward the outside of the vehicle. In the curved elements or portions, the outside corrugation would have, at each point, two different radii of curvature in the same direction. These corrugations tend to have a constant curvature of their cross section, both in the straight elements and in the curved elements or parts.

Figure 1A:
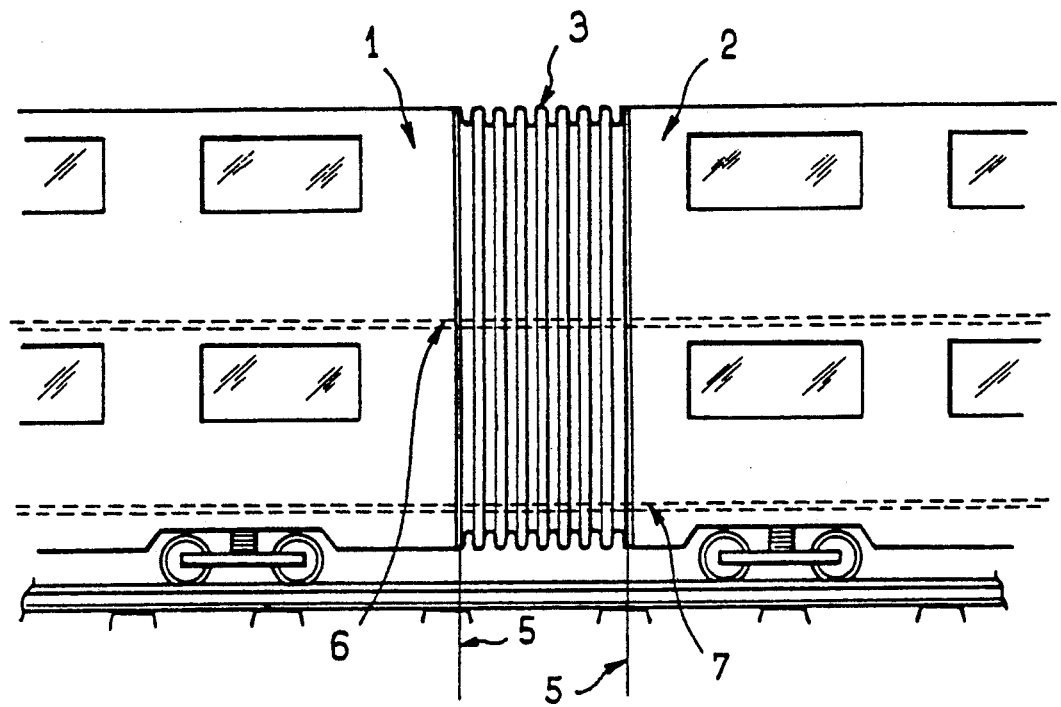
FIG. 1a is a general side view of the preferred system for connecting the vehicles showing the location of the preferred membrane in relation to the vehicles.

FIG. 1a is a general side view including the ends of two successive vehicles 1 and 2 which are permanently coupled together. The coupling problems satisfied by the preferred membrane are generally the most difficult to solve. Specifically, the preferred membrane is to be used on two-story auto-train vehicles which are designed for the transport of automobiles and passengers, for example, in the tunnel under the English Channel. Identical problems may exist in trains used for metropolitan mass transit, tramways, or articulated buses, where the arrangement may be very similar but on a different scale.

Figure 1B:
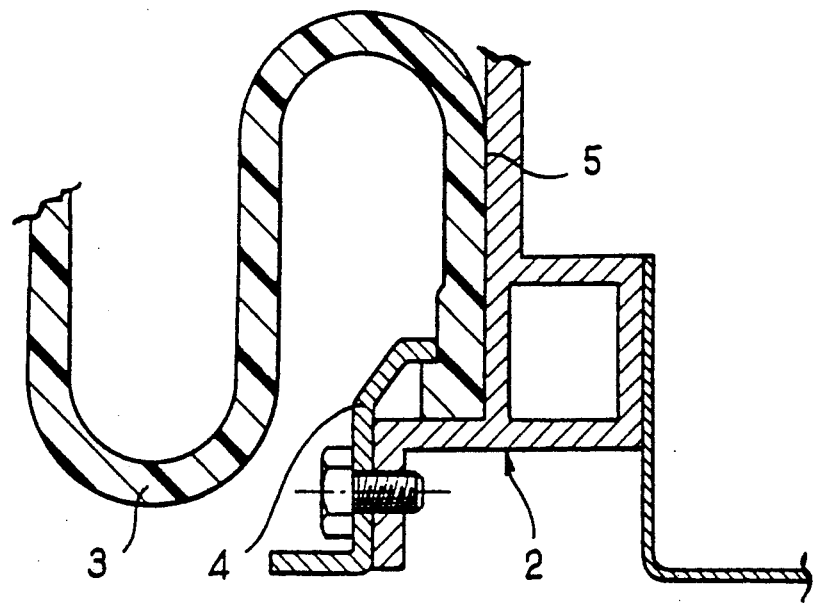
FIG. 1b is a fragmentary sectional view of the connection between one end of the membrane of FIG. 1 and one of the vehicles.
Figure 1C:
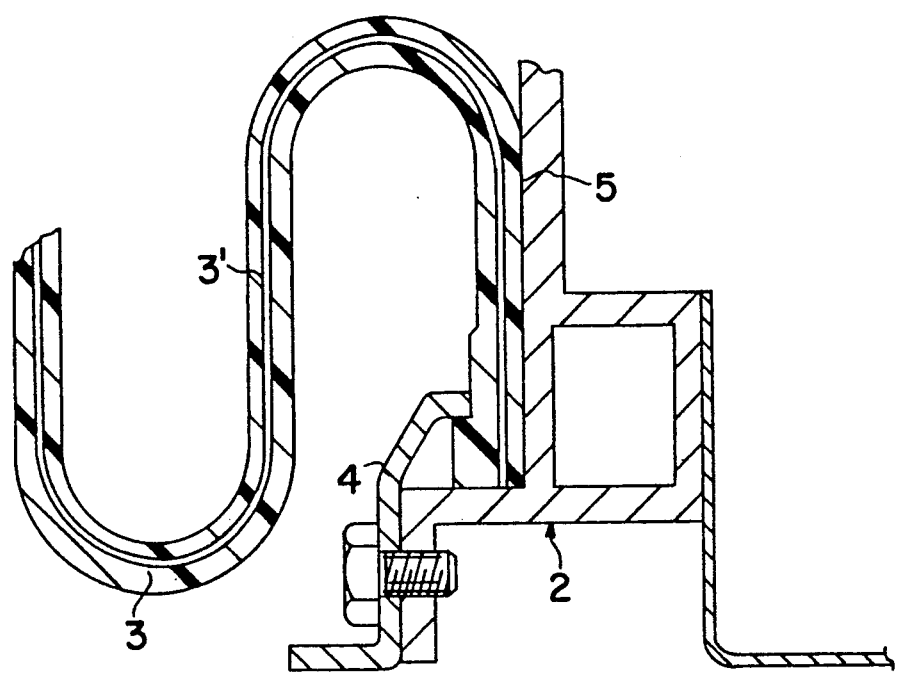
FIG. 1c is a view like that of FIG. 1b including a simplified representation of the reinforcement which is included in the preferred portions of the membrane according to the invention.

As seen in FIGS. 1a, 1b, and 1c, an elastically deformable membrane 3 provides a connection between the bodies of the vehicles 1 and 2. The end of the membrane is preferably connected to each vehicle 1, 2, for example, by fastening flanges 4 which are bolted against flat surfaces 5 at the end of the vehicle 1, 2. It should be clear that other configurations could alternatively be employed. For example, two deformable membranes of the same type could connect the end surfaces of consecutive vehicles to an intermediate frame or to a cradle. However, in any case, the outline of the outside corrugations of the elastically deformable membrane 3 should follow, as closely as possible, the contour of the outline of the vehicles. Such a contour should include the outline of the lower portions which enclose the coupling and traction devices which must be operated through another access. A casing or wing (not shown), to improve the aerodynamics, can be provided to cover or to form an integral part of the fastening flange 4 of the elastically deformable membrane 3. As will be discussed below, continuous floors 6 and 7 ensure the extension of the floors of the vehicles in an appropriately deformable manner and are therefore also enclosed by the membrane 3. As a result, the membrane 3 constitutes a continuous screen which is insulated against noise, dust and bad weather, as well as against the wind caused by travel at high speed as occurs when two trains pass in opposite directions. Because of its own rigidity, the preferred membrane 3 also includes a self-supporting characteristic.

FIG. 1b is an enlarged cross section of a fastening zone of the membrane 3 on one of the vehicles at a curved element or part 11a, 11b, 12a or 12b without any reinforcement in a manner which will be discussed below. On the other hand, FIG. 1c is an enlarged cross section like that of FIG. 1b at a straight element such as 10, 14a, 14b, 16 or 17 having plies of continuous or discontinuous textile or metal reinforcement 3' in a manner which will also be discussed below. In either case, the elastically deformable membrane 3 is mechanically gripped on the support plane or flat surface 5 between the fastening flange 4 and the flat surface 5 of the vehicle 2. The membrane 3 includes a bead to insure a proper position and retention of the membrane 3 by the flange 4 against the flat surface 5.

Figure 2:
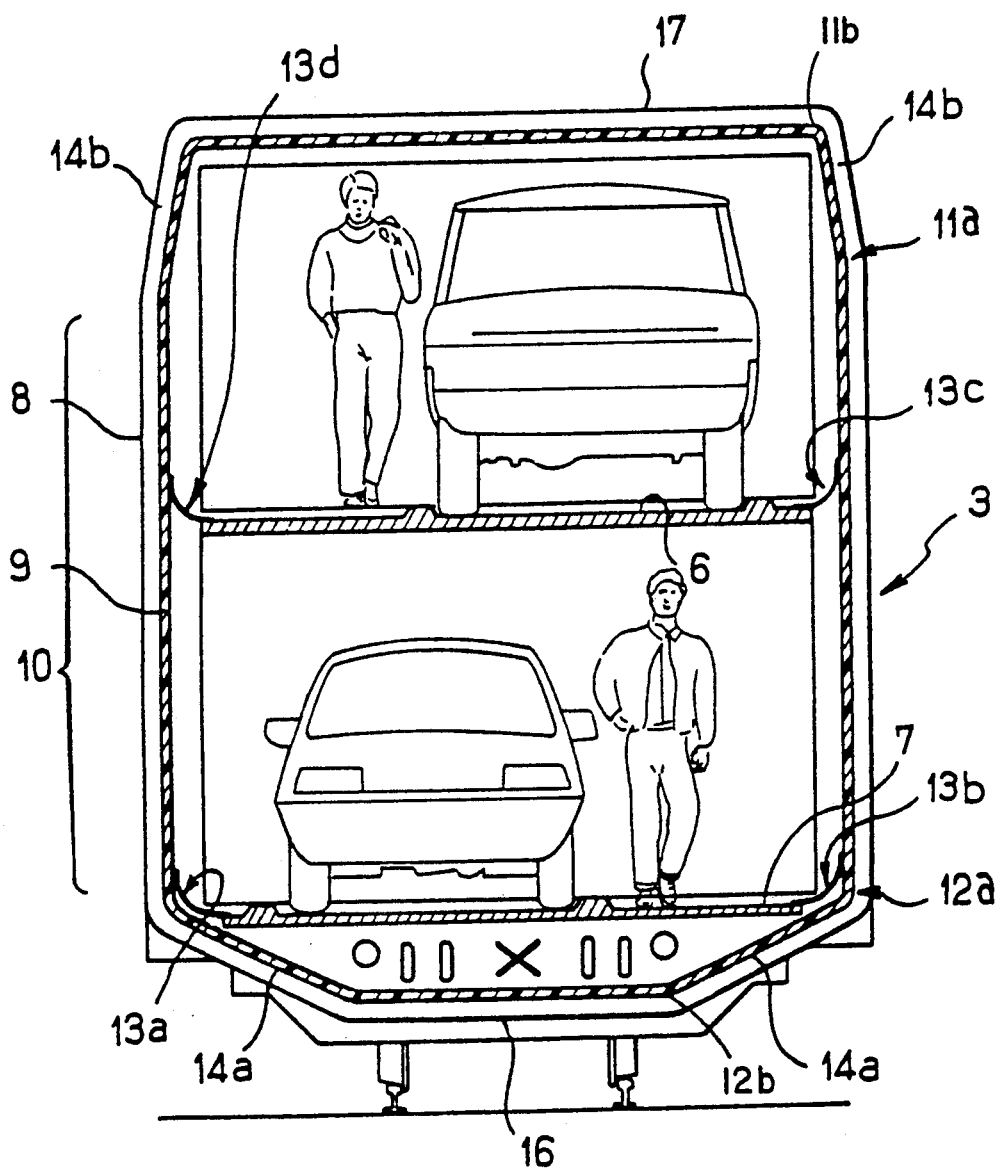
FIG. 2 is a sectional view of the preferred membrane across the vehicles as viewed axially through the vehicles to define the space requirements.

FIG. 2 is a cross-sectional view extending transverse to the vehicles when viewed in an axial direction through the vehicles. The cross section is taken through an elastically deformable membrane 3 across a corrugation thereof and, in this case, at the inside corrugation 9. The cross section of the membrane 3 has been simplified by omitting the reinforcement 3' from the drawing in this and some of the other figures although, as discussed hereinbelow the reinforcement 3' is included in the various straight elements of the membrane in the manner and for the purposes as described.

As noted above, the outside corrugation 8 follows as closely as possible the outline of the outside walls of the vehicles and must not, in any case, project beyond them. In order to make as much of the interior space as possible available in the passage, which is the object of these vehicles, the total depth of the corrugations of the elastically deformable membrane 3 should not exceed twelve centimeters. Consequently, as seen in elevation, the elastically deformable membrane 3 includes vertical straight elements 10 and curved elements or parts such as 11a, 11b, 12a and 12b. The curved parts 11a, 11b, 12a, 12b are generated in a cylindrical manner around a longitudinal axis and include a cross section identical to that of the vertical straight elements 10. However, the curved elements or parts are nondevelopable. In other words, unlike the straight elements, they can not be flattened out upon a plane or surface without some portions thereof being stretched or compressed.

The vertical straight elements 10 which extend the lateral surface of the vehicles must support the major portion of the dead weight of the membrane. In order to prevent bowing, the vertical straight elements 10 have the above-mentioned continuous or discontinuous, textile or metal reinforcements incorporated in the thickness of their wall. Advantageously, the preferential direction of the reinforcement will be oblique but at a slight angle of less than about 30 degrees with respect to the vertical. In the lengthening or shortening deformations of the elastically deformable membrane 3, which is due to banking and displacements between the bodies of the vehicles, the reinforcements will play the role of multiple hinges which oppose the sagging of the elastically deformable membrane 3 under its own weight.

Because of their design, these reinforcements also have the advantage of offering protection against vandalism in the zones accessible to the passengers of the vehicles.

It is also advantageous to reinforce other elements of the membrane 3, such as the oblique straight elements 14a and 14b and/or the horizontal top element 17 and horizontal bottom element 16, in order to provide the same role of multiple hinges. However, the curved parts or elements, such as 11a, 11b, 12a or 12b, will, as mentioned above, advantageously be formed of an unreinforced elastomer compound to allow nondevelopable deformations.

In one embodiment of the invention, in the thickness of the wall, a low flap, matching the shape of the roughly sinusoidal cross section, can be provided. A deformable concertina bellows 13 (FIGS. 8a and 8b) can be attached to the flap by removable means such as eyelets, rivets, adhesive or slide closings. One such bellows 13 and removable means therefor may be of a form as generally shown at 13a, 13b, 13c or 13d in FIG. 2 or as shown in more detail in FIGS. 8a and 8b which will be specifically discussed hereinbelow.

The preferred deformable concertina bellows, which is formed of an unreinforced elastomer compound or from coated fabric, has toward the outside, the shape of the roughly sinusoidal cross section of the elastically deformable membrane 3 to which it is attached. Toward the inside of the bellows, there is means for fastening to one of the floors 6 and 7 in order to provide a passage with the necessary deformability. The fastening of the deformable concertina bellows 13 under the low flap provides a practically impermeable closing not only between the upper and lower passages, but also between the lower passage and the zone under the floor 7, where the couplings and the pneumatic and electrical connections are located. The zone, which forms a quasi-sealed compartment, eliminates the risks of penetration of oil odors and stains due to accidental leaks from connecting lines and contributes to improved soundproofing when the train is in motion.

When there is a vertical difference in the level between the bodies of two consecutive vehicles, because of the maximum sagging of the one and the other remaining fully supported by the suspension, the corrugations can assume an inclination without exerting excessive elastic resisting or return forces. On the other hand, it is quite apparent that the reinforced corrugations function as multiple hinges, for example, about six to about twelve, in the facing vertical straight elements 10. As a result, they have a tendency to resist sagging of the corrugations and provide rigidity and significant leverage action for the roll connection of the bodies of two consecutive vehicles.

The top horizontal straight element 17 and the bottom horizontal straight element 16 are preferably made sufficiently flexible so that the transverse connection between the vehicle bodies will not provide too much resistance to the significant transverse shift encountered when rounding a curve and countercurve. Clearly, the roll stability of a vehicle body, which rotates around a longitudinal axis in relation to the rest of the train, is primarily provided by the connection between the car bodies and, to a lesser extent, by the differential return force of the suspensions.

To design vehicles which are connected by deformable membranes in accordance with the invention, consideration must be given to the fact that the moment of rolling inertia of the vehicles is very high. The elastic recall torque can be modulated, depending on the presence or absence of reinforcements for the horizontal elements 17 and 16 and oblique bottom elements 14a and 14b. The elastic recoil torque will be different upon using metal or textile reinforced elements or unreinforced ones because of the moduli of such elements. A reinforced compound will have a higher modulus than the unreinforced one. If necessary, a reinforcement can be embedded in the horizontal elements 16 and 17 or oblique elements 14a and 14b in order to adjust the characteristic of the whole membrane to the application. As a result, the different elements can participate very differently in the roll recall. It should be clear that the effect of each element will also depend on their respective location relative to the height of the center of the roll, empty or loaded. With the center of the roll being in most cases very closed to the floor of the vehicles, the lever arm of the horizontal top element 17 would have a very high effect.

When entering a curve or exiting a curve toward an alignment, the difference in the levels of the rails is transmitted by the action of the suspension to the first vehicle. However, the elastically deformable membrane will make a major contribution by way of its stiffness and its controlled internal damping to the comfort of those in the vehicles. The fastening flanges must be sized accordingly.

Figure 3:
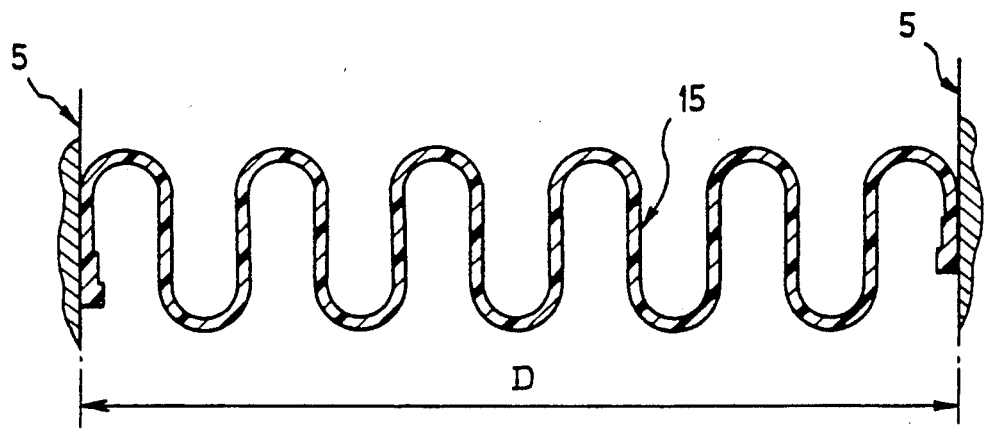
FIG. 3 is a cross-sectional view of the preferred membrane when the vehicles are aligned and properly coupled.

FIG. 3 includes a cross section, at right angles to the wall of the elastically deformable membrane 3, which is applicable to the vertical straight elements 10 and for the curved parts or elements such as 11 and 12 as shown in FIG. 2. As mentioned above, no reinforcement is shown, even though it may be present in the straight element 10, in order to simplify the drawing. The distance D between the two contact planes on the flat surfaces 5 of the vehicles is obtained, after coupling, by a compression on the order of about 10% to about 15% of the space occupied by the membrane in the free state.

Figure 4:
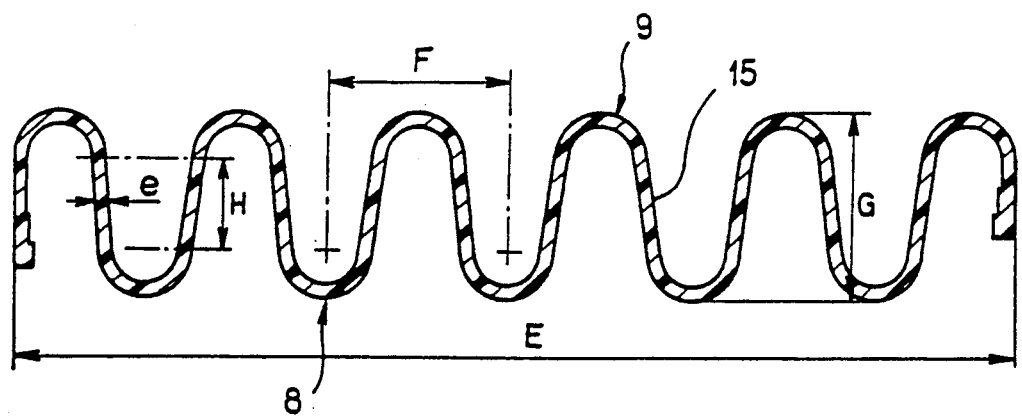
FIG. 4 is the cross-sectional view of the preferred membrane of FIG. 3 in its free state such as, for example, when the vehicles are uncoupled.

FIG. 4 is the same cross section of the elastically deformable membrane of FIG. 3 in a relaxed condition or a free state, as occurs when it is installed on a single, uncoupled vehicle. In the free state, the membrane occupies the space E for center-to-center distance F between two consecutive corrugations. It will be noted that the flat part of the wall 15 with a length H between each two corrugations is designed so that, in the operating position when the vehicles are coupled with the distance D therebetween, the walls 15 are essentially parallel to the surfaces 5 of the vehicles 1, 2. For this reason, the walls in the free state have a slight slope to include a total depth G of the corrugations which represents the space occupied by the elastically deformable membrane and is substantially equal to the center-to-center distance F between them.

The thickness e of the wall in the inside corrugations 9, in the outside corrugations 8, and in the flat parts 15 is essentially constant and, preferably, at least six millimeters. The inside and outside radii at each corrugation 8, 9 are respectively on the order of about two-and-one-half times to about four times the thickness e in the operating position. Of course, these radii vary when the corrugations 8, 9 bend to provide the deformations of the membrane which essentially occurs during expansion and compression of the straight elements. In the curved elements, portions or parts such as 11a, 11b, 12a and 12b of FIG. 2, deformation of the entire wall is necessary. Consequently, in these zones, an elastomer compound without textile or metal reinforcement should be used.

Figure 5:
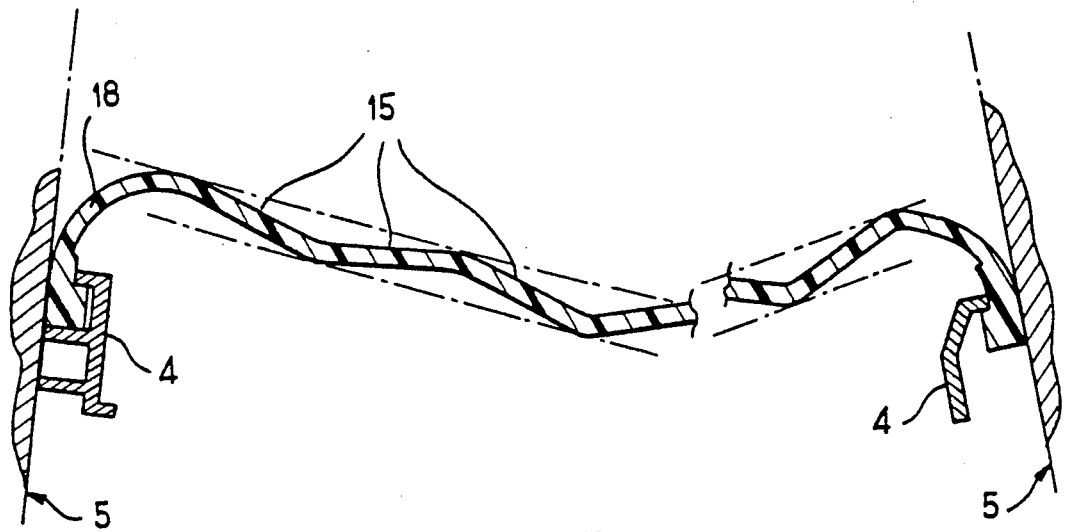
FIG. 5 is the cross-sectional view of the preferred membrane of FIG. 3 when it is stretched to the maximum between the vehicles at the outside of curved path of the vehicles.
Figure 6:
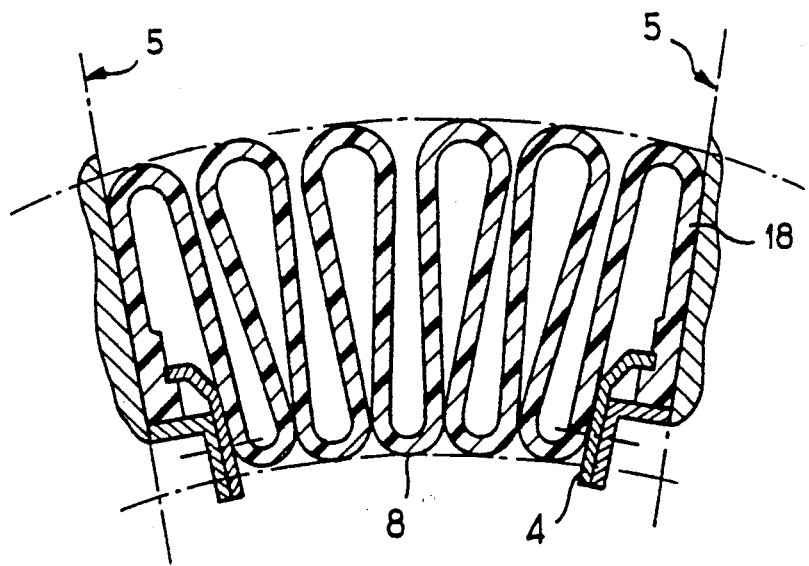
FIG. 6 is the cross-sectional view of the preferred membrane of FIG. 3 when it is compressed to the maximum extent between the vehicles at the inside of a curved path of the vehicles.

FIGS. 5 and 6 show the maximum allowable deformations of the elastically deformable membrane which was shown in the free state in FIG. 4. During extension, as shown in FIG. 5, the flat parts of the wall 15 have a tendency to be aligned with each other and to appear almost as extensions of the curved parts of the corrugations. A portion of the beads 18 which are gripped by the flanges 4 is also capable of deforming or bending and therefore tends to prevent a total alignment of the material, which could result in the beads 18 being broken. In the opposite operating condition caused by compression during travel around a curve, as illustrated in FIG. 6, the complete crushing of the curved portion of the outside corrugations 8 must be avoided to insure that the zone will not break.

Under extreme circumstances, angles resulting from the curvature of the vehicle paths or trajectory are formed between the axes of the corrugations. The mounting of the fastening flanges 4 at the outside of the vehicles 1, 2 proves more favorable for operation in extension. On the other hand, during operation under compression, the flanges 4 at the outside of the vehicles 1, 2 tend to establish limitations which are more restrictive.

An intermediate operating case (not shown) is encountered when there is a maximum axial misalignment between the bodies of the vehicles 1, 2, due to the passage through a curve followed by a countercurve. In such a case, the elastically deformable membrane, which will have a deployed length which differs only slightly from D in FIG. 3, will include a bead 18 stretched from its flat surface 5, as shown in FIG. 5, as the other bead 18 is compressed toward its flat surface 5, as shown in FIG. 6. In such a position, the internal shear stresses in the top horizontal straight element 17 and the bottom horizontal straight element 16 (FIG. 2) tend to limit the performance, in particular, the alternating fatigue strength of the membrane, but not the geometry of the membrane. The resulting shear stresses will tend to push all the corrugations around a vertical axis in the direction of the stress and the geometric deformation tends to be only limited, on the one hand, by contact between the corrugations and, on the other hand, by the maximum extension of the elastically deformable membrane.

FIG. 7 is based on the same tendencies and shows, in a side view similar to that of FIG. 1a, a vertical difference in the levels between two vehicles or bodies. Specifically, vehicle 1 is sagging on its suspension stops, and vehicle 2 is raised, either because it is empty or because of a malfunction of its levelling equipment. FIG. 7 assumes parallelism of the flat surfaces of the vehicles. The elastically deformable membrane assumes the maximum inclination permitted by the contact of the corrugations with one another at the top of the sagging vehicle and at the bottom of the raised vehicle. The particular corrugation located in the plane of symmetry 19 will have the maximum inclination permitted by the contact or stop of the extreme corrugations, as well as the maximum shear stresses in the two adjacent plane parts. It should be noted that although the accidental collapse of a single suspension is possible, generally, appropriate technical means can be adopted to avoid such inclination of a vehicle which would create a danger of shifting of the loads.

FIGS. 8a and 8b demonstrate the method for fastening the preferred deformable concertina bellows 13, which is adapted to the shape of the elastically deformable membrane 3, to provide a quasiseal between the membrane 3 and one of the deformable floors 6, 7 between passage compartments.

FIG. 8b is a cross section along line AA in FIG. 8a while FIG. 8a is a cross section along line BB in FIG. 8b.

FIG. 8a is an enlarged view of the zone surrounding the deformable concertina bellows shown at 13d in FIG. 2. The elastically deformable membrane 3 is shown in cross section in a plane transverse to the vehicle at the base of an inside corrugation 9. A low flap 20 is connected to the wall only at its upper part, possibly with a reinforcement in the thickness of the wall, and has the shape of the straight cross section of the entire membrane.

The fastening, which should remain deformable over the length of the flap 20 as necessary, can be provided by a simple engagement of a bead in a matching groove. Such fastening may include an attachment of the edge of the deformable concertina bellows 13 under the flap 20 with adhesive or by lacing with a cord which alternately traverses eyelets in the two components 13 and 20. Pushbutton closures are also possible, as well as turnbuckles which are fixed on the deformable bellows 13 and extend through corresponding oval eyelets in the flap 20.

A preferred method of fabrication for the elastically deformable membrane 3 which is the object of the invention comprises the assembly and partial vulcanization of the straight elements and the curved elements in appropriate molds.

For the straight elements, stacks of textile or metal cable plies may be superimposed with sheets of connecting elastomer compound and coatings of another elastomer compound, which is most often of a different formulation because of the expandable character of the corrugations. These stacks can be placed in a mold and chucked by a packing at each extremity.

The preferred flaps for fastening the deformable bellows will always be located in the straight elements. The curved portions or parts will be provided by bending sheets of elastomer compound, which are connected to the ends of the straight elements, after tapering and, if necessary, peeling of the reinforcements, as many times as necessary to realize the entire elastically deformable membrane. The straight elements will have already been pre-vulcanized and placed in a connection mold.

Generally, the straight elements 10 preferably include at least two plies of continuous or discontinuous textile or metal reinforcement. The continuous reinforcement can be present in the form of single wires, which are assembled or composed, or of threads, or of cables, or of assemblies such as knitted or woven fabrics of different textures. The discontinuous reinforcement comprises relatively short elements (no more than 30 millimeters) free in the form of short dispersable fibers or assembled in the form of felt or non-woven fabric. The continuous or discontinuous reinforcement can comprise natural fibers such as cotton, artificial fibers such as rayon or spun rayon, and/or synthetic fibers such as polyamide, polyester, aramid, polyvinyl alcohol, polyacrylonitrile or carbon fibers.

Still further, the reinforcement can be of a mineral nature such as glass or of an organic nature such as one of the synthetic fibers cited above. It can also comprise brass-plated or zinc-plated steel cables which can be long fibers or in the form of fabrics for continuous reinforcement or in the form of short fibers for discontinuous reinforcement. Regarding the angles of reinforcement with respect to the vertical for the completed elements 10, the reinforcement can be included with the best results being obtained when the direction of reinforcement is less than 30 degrees from the vertical.

The base materials of the elastomer compounds will preferably include elastomers having chlorine or bromine atoms in their molecular chain. Without specifically limiting which elastomers may be employed, some examples include polychloroprene, butyl chlorinated rubber, butyl brominated rubber, or even chlorinated polyethylene. The formulations of these elastomer compounds can obviously be altered by the addition of fillers and of anti-oxidation and vulcanizing agents.

A typical elastomer compound consists of:
synthetic elastomer: 100 parts by weight
anti-oxidizing additives: 2 to 7 parts by weight
plastifier: 3 to 100 parts by weight
powder reinforcing fillers: 0 to 100 parts by weight
reticulation agent: 3 to 15 parts by weight In addition, the elastomer compound used for forming the reinforced elements of the membrane 3 can include a reinforcing agent consisting of short fibers such as those listed above.

The synthetic elastomer, for fire resistance, is preferably selected from among the halogenated elastomers, such as:
polychloroprene
butyl chlorinated rubber
brominated butyl rubber
chlorinated polyethylene
a copolymer of isoprene and halogenated isobutylene (chlorinated or brominated)
or a mixture of these elastomers.

The system of anti-oxidation additives will be of the conventional type used in the rubber transformation industry. They will be composed, for example, of aromatic amines alone or in association with other components.

The system of plastifiers generally includes at least one paraffin, naphthenic or aromatic oil which may be combined with a wax or another plastifier.

The powder reinforcement filler will be preferably selected from the vast range of carbon blacks or light-colored fillers such as silica. The proportion in the vertical straight elements or in the curved elements would preferably be less than 50 parts per 100 parts of elastomer.

The reticulating system of the elastomer must be appropriate to the nature of the elastomer, and generally consists of zinc oxide, stearic acid, one (or more) accelerators, and a reticulation agent. Other reticulation systems, such as those with organic peroxide bases, can also be used.

When appropriate, the elastomer compound can also include an adherence promoting system, of the RFS type, intended to cause, for example, by a continuous process, adhesion—in situ—between the reinforcement and the elastomer compound.

The following compound is an example of a formulation on a synthetic elastomer base, polychloroprene, with a conventional reticulation system composed of magnesia, stearic acid and zinc oxide. The system of plastifiers is comprised of naphthenic oil, and the powder reinforcing filler is carbon black.

The composition by weight is as follows:

| COMPONENTS | PROPORTIONS BY WEIGHT |
|---|---|
| Sulfur-modified polychloroprene | 100.00 |
| Stearic acid | 0.50 |
| Zinc oxide | 5.00 |
| Magnesium oxide | 4.00 |
| Ethylene thiourea | 0.60 |
| Anti-oxidants | 2.50 |
| Naphthenic oil | 10.00 |
| HAF Black | 50.00 |
| Lead oxide | 20.00 |

The covering of the membrane is preferably made of a fireproofing compound based on a synthetic elastomer matrix such as polychloroprene, chlorinated polyethylene, butyl chlorinated rubber, brominated butyl rubber, or a mixture of these or other similar elastomers. The compound that coats the textile or metal reinforcement may contain less reinforcing fillers than the covering and can be based either on synthetic elastomers or on natural rubber. Generally, it should be noted that the composition of the elastomer compounds may be different in the different elements of the membrane because of the different functions they are intended to serve.

As mentioned above, the preferred deformable concertina bellows 13 can be formed of an unreinforced elastomer compound or from coated fabric. Various elastomer compounds, without reinforcement, as discussed herein for use in the membrane 3 could be employed to form the bellows 13. Alternatively, the coated fabric may be composed of a textile base which is either natural, such as cotton; artificial, such as rayon; or synthetic, such as polyamide or polyester. The textile base may be in the form of a fabric with large stitches or be knitted. The coating may be an elastomer compound comprising a natural or synthetic rubber base, reinforcing fillers, such as carbon black, and a vulcanizing agent.

The preferred deformable bellows are shaped during fabrication, preferably by vulcanization of the coated fabric in an appropriate mold, so that it can be applied or installed in the appropriate shape at rest against the elastically deformable membrane. The extremities would also have appropriate shapes so that they can be fastened, on one hand, to the rigid surfaces of the floors of the vehicles and, on the other hand, to those of the deformable floors surrounded by the membrane.

The installation of a completed membrane on the vehicle must be accomplished prior to the coupling of the vehicle by the progressive attachment of the flanges made of straight or curved elements to one of the vehicles first. The installation on the other vehicle takes advantage of the rigidity of the elastically deformable membrane, prior to its compression. Positioning is accomplished by means of appropriate centering cones to compensate for the deflection of the free extremity of the membrane under its own weight. A typical centering cone and its function and operation are disclosed in U.S. Pat. No. 4,375,857 entitled "Automatic Railway Controlled Buffer Coupling", which is incorporated by reference as if the entire contents thereof were fully set forth herein.

It should now be clear that the choice of formulations of elastomer compounds, essentially for the two coverings or coatings of the exposed inside and outside surfaces, provides resistance to fire and to weathering. The formulation of the elastomer compounds of the connecting layers constituting the core of the wall and, in particular, the curved parts thereof, can provide them with a high deformability and a good alternate bending fatigue strength, as well as acoustical and thermal insulation properties. High deformability and low conductivity can be simultaneously realized by the use of elastomer compounds having a low proportion of fillers.

On the other hand, the resistance to fire and protection against the effects of weather, atmospheric ozone, solar radiation and the washing water will require elastomer compounds which have high proportions of fillers. Such fillers will preferably comprise borates, antimony oxide or hydrated alumina, in a synthetic elastomer matrix such as polychloroprene, polyethylene chloride or other halogenated elastomers.

It should be noted that a one-piece elastically deformable membrane, in accordance with the invention, gives the transportation industry the possibility of connecting, with a single connecting piece, two consecutive vehicles by means of a passage having a maximum cross section, which is practically an extension of the walls of the vehicles. This one-piece elastically deformable membrane, which is easy to install, protects the passengers and the vehicles transported against bad weather and the wind due to travel at high speed and noise. It provides protection against the weather and against untimely emissions of bad odors or accidental emissions from the coupling, the buffers and the pneumatic or electrical lines. The preferred membrane contributes in a controllable manner to the elastic rolling connection between the bodies of the successive vehicles or cars of a train, such as an auto-train, or a metropolitan transit vehicle to allow circulation by the passengers over the entire length of the vehicle.

From the information provided hereinabove, it can now be seen that the preferred elastically deformable membrane 3 is for intercommunication between successive railway or road vehicles while providing a maximum passage cross section in the extension of the walls of the vehicles. The membrane 3 is characterized by the fact that it comprises a corrugated surface, formed by parallel rings, which has, in the free state, a roughly sinusoidal cross section. The membrane 3 is partly compressed during installation between two contact planes 5 on the flat end surfaces of the coupled vehicles 1 and 2 to which it is connected by fastening flanges 4, so that the flat parts 15 of the wall remain essentially parallel to the contact planes 5.

The cross section of membrane 3 may comprise vertical straight elements 10 and top and bottom horizontal straight elements 17 and 16, connected by curved parts such as 11a, 11b, 12a and 12b, which are nondevelopable, and by oblique straight elements 14a and 14b.

The elastically deformable membrane 3 may be a one-piece structure with the wall in the vertical straight elements 10 including at least two plies of continuous or discontinuous textile or metal reinforcement, intimately bonded to an elastomer compound. The wall in the curved parts such as 11a, 11b, 12a and 12b, which provide connection between said vertical straight elements 10, can include at least two layers of elastomer compounds without textile or metal reinforcement. The thickness e of the entire wall should be substantially constant.

The preferred elastically deformable membrane 3 may be characterized by the fact that the elastomer compound constituting the coverings or coatings of its exposed inside and outside surfaces has a formulation which is resistant to fire, weatherproof, resistant to atmospheric aging and wash water. Still further, the formulation of the elastomer compound which constitutes the coating may include an elastomer containing in its molecule halogen atoms, such as chlorine or bromine, and fireproofing fillers such as borates, antimony oxide or hydrated aluminum.

The elastically deformable membrane 3 may be characterized by the fact that the elastomer compound comprising the connection layers in the core of the wall, both in the vertical straight elements 10 and in the curved parts such as 11a, 11b, 12a and 12b, may have a formulation comprising only a small ratio of fillers to ensure high alternate bending fatigue strength and good thermal and acoustical insulation properties.

In the constant thickness e of the wall, there may be included a low flap 20, possibly reinforced, to which is connected, in an approximately sealed manner, a deformable bellows 13 for closing the space between the elastically deformable membrane 3 and the floors 6 and 7 which connect the floors of the vehicles 1 and 2. The constant thickness e of the wall is preferably at least six millimeters.

The preferred elastically deformable membrane 3 may provide an elastic connection, in roll and in forward movement, the damping of which can be modulated by the formulation of the elastomer compounds and by the type and proportion of the continuous or discontinuous textile or metal reinforcements, in particular in the oblique straight elements 14a and 14b.

The elastic compression stroke of the preferred membrane 3 is used, during the coupling of the vehicles, for a positioning by means of centering cones, to compensate for the deflection of the free end of the membrane under its own weight. The elastic compression stroke between the length in the free state D and the space occupied in operation E is approximately 10% to 15% of the length in the free state D.

A number of patents disclose the formation of deformable elements including elastomer material with reinforcing elements therein as follows: U.S. Pat. No. 3,980,119, entitled "Bias-Ply Pneumatic Tire For Motorcycles"; U.S. Pat. No. 4,121,641, entitled "Pneumatic Tire For Motorcycle"; U.S. Pat. No. 4,142,568, entitled "Bias Tire With Embedded Wire Breakers"; U.S. Pat. No. 4,146,415, entitled "Process For Manufacturing Tires"; U.S. Pat. No. 4,187,349, entitled "Bonding Of Rubber To Reinforcing Elements"; U.S. Pat. No. 4,278,726, entitled "Energy Absorbing Elements Comprising Rigid Non-Elastomeric Layer And Visco-Elastic Layer With Twisted Fiber Bundles Embedded Therein"; U.S. Pat. No. 4,308,093, entitled "High Temperature Resistant Compressible Sheet Material For Gasketing And The Like"; U.S. Pat. No. 4,511,619, entitled "Sealing Sheet Of Elastomeric Synthetic Resins With Textile Reinforcement On Outer Layer"; U.S. Pat. No. 4,721,498, entitled "Endless Elastomeric Drive Belt"; and U.S. Pat. No. 4,744,401, entitled "Pneumatic Tire Reinforced With Fabric".

Additional patents disclose different means for interconnecting relatively moveable adjacent railway or road vehicles as follows: U.S. Pat. No. 4,191,107, entitled "Articulated Railway Car"; U.S. Pat. No. 4,233,909, entitled "Railway Car Assembly Composed Of A Series Of Articulately Interconnecting Cars"; U.S. Pat. No. 4,244,297 entitled "Articulated Railway Car Trucks"; and U.S. Pat. No. 4,690,067, entitled "Device For Interconnecting A Portal Passageway Between Two Rail Vehicles".

All of the above-mentioned patents and any and all other patents and publications elsewhere mentioned in this specification are hereby expressly incorporated by reference as if the contents thereof were set forth in full herein.

The invention as described hereinabove in the context of a preferred embodiment is not to be taken as limited to all of the provided details thereof, since modifications and variations thereof may be made without departing from the spirit and scope of the invention.

What is claimed is:

1. A system for connecting railway vehicles having longitudinal wall means extending along a direction of movement of the vehicles and each of the vehicles having ends extending substantially transverse to the longitudinal wall means, said system comprising:

and elastically deformable membrane;

said membrane having at least a partial tubular form for substantial alignment with the longitudinal wall means when said membrane is positioned between the ends of adjacent vehicles and the ends of the adjacent vehicles are positioned at a substantially predetermined distance from one another;

said membrane having opposite ends for being respectively connected to the ends of the adjacent vehicles;

said membrane having a wall, said wall having a plurality of connecting portions and a plurality of arcuate portions, each said arcuate portion connecting two connecting portions to form a plurality of corrugations, each of said corrugations extending at least partially around said tubular form;

the adjacent vehicles having means for connecting the adjacent vehicles and positioning the adjacent vehicles to provide said substantially predetermined distance between the ends of the adjacent vehicles;

said corrugations of said membrane being at least partially compressed when said opposite ends of said membrane are respectively connected to the ends of stationary, aligned and adjacent vehicles that are disposed form each other by said predetermined distance and when the longitudinal wall means of a first vehicle is being aligned with the longitudinal wall means of a second vehicle;

said membrane defining a first distance between said opposite ends of said membrane before said membrane is connected to the first vehicle and the second vehicle and said corrugations are at least partially compressed;

said membrane defining a second distance between said opposite ends of said membrane after said membrane is connected to the first vehicle and the second vehicle and said corrugations are at least partially compressed and wherein said second distance is less than said first distance.

2. The system of claim 1, wherein:

said connecting portions of said wall are generally parallel to one another when said corrugations of said membrane are at least partially compressed; and said connecting portions of said wall diverge from one another without said corrugations of said membrane being at least partially compressed.

3. The system according to claim 2, wherein said each of said corrugations includes a substantially sinusoidal cross section, said sinusoidal cross section includes opposite curved portions connected by a substantially straight portion therebetween, said substantially straight portions of said corrugations being essentially parallel when said opposite ends are disposed from each other by said predetermined distance.

4. The system according to claim 3, further including flange means for connecting each of said opposite ends to a corresponding one of said ends of said vehicle, wherein said each of said opposite ends includes terminal edge means and said flange means including a portion which overlies said terminal edge means for entrapping said terminal edge means between said portion and said corresponding one of said ends of said vehicle.

5. The system according to claim 4, wherein said opposite ends are disposed from each other by a distance when said membrane is in a relaxed condition and only one of said opposite ends is connected to said corresponding one of said ends of said vehicles prior to said vehicles being connected to provide said predetermined distance between said ends thereof and said distance is greater than said predetermined distance.

6. The system according to claim 5, further including a difference between said distance and said predetermined distance which is about 10% to about 15% of said distance.

7. The system according to claim 6, further including an elastically deformable bellows means and at least one connecting floor, wherein said at least one connecting floor is for extension between said ends of said vehicles being adjacent to one another and said deformable bellows means is connected to an interior of said membrane and said at least one connecting floor to close a space therebetween.

8. The system according to claim 7, wherein each of said corrugation includes a substantially sinusoidal cross section, said interior of said membrane includes a flap extending longitudinally across said corrugations, said flap has a corresponding cross section to match said substantially sinusoidal cross section of said corrugations, said deformable bellows means includes an edge portion having a substantially sinusoidal shape, and said edge portion is connected between said flap and said corrugations of said membrane.

9. The system according to claim 8, wherein said flap includes an upper edge, said flap is connected to said corrugations at an upper edge, and said flap is reinforced at said upper edge.

10. The system according to claim 1, wherein said membrane includes an exposed inside surface and an exposed outside surface, said membrane is formed of an elastomer compound including a covering on at least one of: said inside surface and said outside surface, and said covering includes means for resisting at least one of: fire, weather, atmospheric aging and wash water.

11. The system according to claim 10, wherein said membrane is formed of an elastomer compound comprising connection layers in said corrugations and said elastomer compound includes means for providing high alternate bending fatigue strength, thermal insulation properties and acoustical insulation properties.

12. The system according to claim 11, wherein said covering includes an elastomer which contains halogen atoms in its molecule and includes fireproofing fillers including at least one of borates, antimony oxide, and hydrated aluminum.

13. The system according to claim 12, wherein said membrane has a tubular form and said each of said corrugations extends around said tubular form.

14. A method for connecting a first vehicle to a second vehicle comprising the steps of:
providing an elastically deformable membrane, said membrane being connected to the first vehicle and the second vehicle, said membrane having a wall comprising a plurality of connecting portions and a plurality of arcuate portions, each said arcuate portion connecting two said connecting portions to form a plurality of corrugations, said corrugations of said membrane being at least partially compressed when said membrane is connected to the first vehicle and the second vehicle while the first vehicle and the second vehicle are stationary and when the first vehicle is connected to the second vehicle;
aligning the first vehicle with the second vehicle;
connecting said membrane to the first vehicle;
connecting said membrane to the second vehicle; and
connecting the first vehicle to the second vehicle while both vehicles are stationary thereby at least partially compressing said corrugations of said membrane
said membrane defining a first distance between said opposite ends of said membrane before said membrane is connected to the first vehicle and the second vehicle and said corrugations are at least partially compressed;
said membrane defining a second distance between said opposite ends of said membrane after said membrane is connected to the first vehicle and the second vehicle and said corrugations are at least partially compressed and wherein said second distance is less than said first distance.

15. The method of claim 14, wherein:
said connecting portions of said wall are generally parallel to one another when said corrugations of said membrane are at least partially compressed; and
said connecting portions of said wall diverge from one another without said corrugations of said membrane being at least partially compressed.

16. A system for connecting railway vehicles or the like, each of the vehicles having longitudinal wall means extending along a direction of movement of the vehicles and each of the vehicles having ends extending substantially transverse to the longitudinal wall means, said system comprising:
an elastically deformable membrane;
said membrane having at least a partial tubular form for substantial alignment with the longitudinal wall means when said membrane is positioned between the ends of adjacent vehicles;
said membrane having opposite ends for being respectively connected to the ends of adjacent vehicles;
said membrane having a wall, said wall having a plurality of connecting portions and a plurality of arcuate portions, each said arcuate portion connecting two connecting portions to form a plurality of corrugations, each of said corrugations extending at least partially around said tubular form;

said corrugations of said membrane being at least partially compressed when said membrane is connected to the vehicles while said membrane defining a first distance between said opposite ends of said membrane before said membrane is connected to the first vehicle and the second vehicle and said corrugations are at least partially compressed;

said membrane defining a second distance between said opposite ends of said membrane after said membrane is connected to the first vehicle and the second vehicle and said corrugations are at least partially compressed and wherein said second distance is less than said first distance and the vehicles being further mechanically connected to one another to position the longitudinal wall means of the vehicles in alignment with one another;

said membrane including a plurality of longitudinal sections;

at least some of said longitudinal sections being generally curved about at least one longitudinally extending axis extending along the direction of movement of the vehicles; and at least others of said longitudinal sections being generally planar and being substantially parallel to said at least one longitudinally extending axis.

17. The system of claim 16, wherein:
said connecting portions of said wall are generally parallel to one another when said corrugations of said membrane are at least partially compressed; and
said connecting portions of said wall diverge from one another without said corrugations of said membrane being at least partially compressed.

18. The system according to claim 17, having said at least one of said longitudinal sections and said corrugations thereof which are nondevelopable.

19. The system according to claim 18, wherein others of said longitudinal sections other than said at least some of said longitudinal sections include reinforcement means being bonded to said elastomer compound thereof and said at least some of said longitudinal section are substantially free of said reinforcement means.

20. The system according to claim 19, wherein said reinforcement means includes at least two plies of at least one of continuous textile reinforcement, discontinuous metal reinforcement, continuous metal reinforcement, and discontinuous textile reinforcement.

21. The system according to claim 20, wherein each of said plies and said reinforcement thereof is oriented at an angle of less than 30° with respect to a direction of said corrugations extending at least partially around said tubular form.

22. The system according to claim 21, wherein said membrane has a thickness which is substantially equal throughout said at least some of said longitudinal sections and said at least others of said longitudinal sections.

23. The system according to claim 22, wherein said thickness is at least six millimeters.

24. The system according to claim 23, wherein said membrane includes means for modulating the elastic recall torque between said vehicles that are adjacent to one another when said membrane is connected therebetween.

25. The system according to claim 24, wherein said membrane has a tubular form and said each of said corrugations extends around said tubular form.

26. The system according to claim 25, wherein:
said corrugations define an at least partially curved surface;
said at least partially curved surface defines a radius of curvature; and
said radius of curvature is about 2.5 to about 4 times said thickness.

27. The system according to claim 26, wherein said membrane is formed of a base material including an elastomer compound including at least one of chlorine and bromine.

28. The system according to claim 1, wherein:
said second distance between said opposite ends of said membrane are about 10% to about 15% less than said first distance.

* * * * *

UNITED STATES PATENT AND TRADEMARK OFFICE
CERTIFICATE OF CORRECTION

PATENT NO. : 5,033,395

DATED : July 23, 1991

INVENTOR(S) : Jean-Pierre Bechu, et. al.

It is certified that error appears in the above-identified patent and that said Letters Patent is hereby corrected as shown below:

Column 16, line 29, after 'membrance', insert --;--.

Column 17, line 3, after 'while', insert -- the vehicles are stationary;--.

Column 18, line 6, delete the first instance of "metal" and insert -- textile--.

Column 18, line 7 after 'discontinuous', delete "textile" and insert--metal--.

Signed and Sealed this

Twenty-sixth Day of January, 1993

Attest:

STEPHEN G. KUNIN

*Attesting Officer*   Acting Commissioner of Patents and Trademarks